(12) United States Patent
Hundley et al.

(10) Patent No.: US 9,770,881 B1
(45) Date of Patent: Sep. 26, 2017

(54) ENERGY ABSORBING TUBES AND METHODS OF MAKING THE SAME

(71) Applicant: HRL Laboratories, LLC, Malibu, CA (US)

(72) Inventors: Jacob M. Hundley, Newbury Park, CA (US); Alan J. Jacobsen, Woodland Hills, CA (US); William Carter, Calabasas, CA (US); Tobias A. Schaedler, Oak Park, CA (US); Sophia S. Yang, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 692 days.

(21) Appl. No.: 14/197,073

(22) Filed: Mar. 4, 2014

Related U.S. Application Data

(60) Provisional application No. 61/913,152, filed on Dec. 6, 2013.

(51) Int. Cl.
*B32B 1/08* (2006.01)
*B32B 37/14* (2006.01)

(52) U.S. Cl.
CPC ............... *B32B 1/08* (2013.01); *B32B 37/14* (2013.01)

(58) Field of Classification Search
CPC .................................. B32B 1/08; B32B 37/14
See application file for complete search history.

(56) References Cited

U.S. PATENT DOCUMENTS

| | | | |
|---|---|---|---|
| 3,744,338 A * | 7/1973 | Komatsu | B62D 1/192 188/374 |
| 6,082,926 A | 7/2000 | Zimmer | |
| 6,877,774 B2 | 4/2005 | Banyas | |
| 7,382,959 B1 | 6/2008 | Jacobsen | |
| 7,527,849 B2 | 5/2009 | Landi | |
| 7,653,279 B1 | 1/2010 | Jacobsen | |
| 8,353,240 B1 * | 1/2013 | Schaedler | F41H 5/007 89/36.02 |

* cited by examiner

*Primary Examiner* — Michael C Miggins
(74) *Attorney, Agent, or Firm* — Lewis Roca Rothgerber Christie, LLP (57) ABSTRACT

An energy absorbing structure configured to buckle in response to an impulsive load includes a facesheet and a micro-truss core coupled to the facesheet. The facesheet and the micro-truss core are wound together into a hollow tube structure. The hollow tube structure may have any shape suitable for the intended application of the energy absorbing structure, including prismatic shapes, non-prismatic shapes, axisymmetric shapes, and non-axisymmetric shapes. In one embodiment, the stiffness of the micro-truss core varies axially, radially, and/or circumferentially along the energy absorbing structure.

22 Claims, 10 Drawing Sheets

ENERGY ABSORBING TUBES AND METHODS OF MAKING THE SAME

CROSS-REFERENCE TO RELATED APPLICATION

This application claims the benefit of and priority to U.S. Provisional Application No. 61/913,152, filed on Dec. 6, 2013, the entire content of which is incorporated herein by reference.

FIELD

The present invention relates generally to energy absorbing structures, and, more particularly, to energy absorbing tubes having an open cellular core.

BACKGROUND

Figure 1:
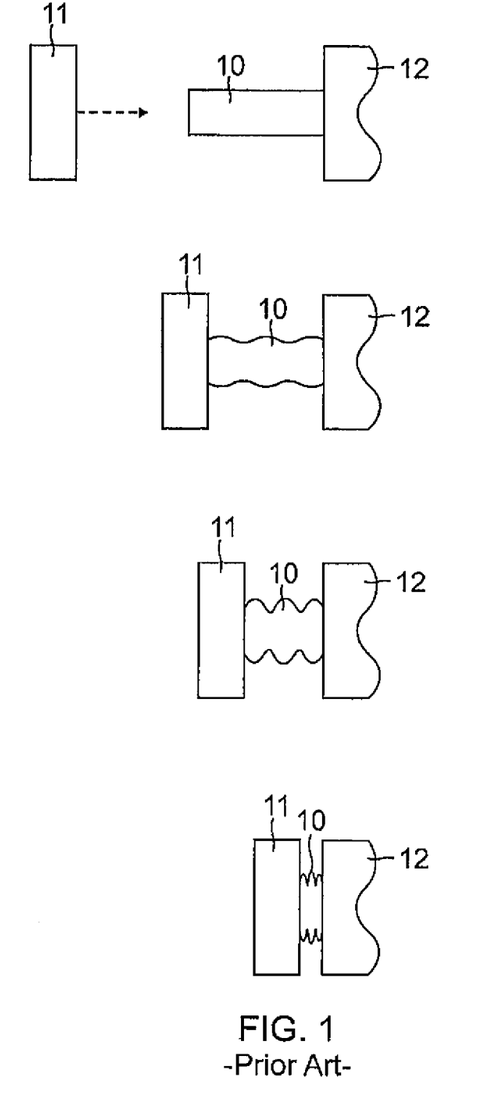
FIG. 1 illustrates the energy absorbing and buckling response of a related energy absorbing tube in response to an impulsive load.

Energy absorbing structures are commonly incorporated into vehicles and other structures to protect personnel, structure, and/or property against impulsive loads associated with a dynamic event, such as an impact, blast, or a crash. As illustrated in FIG. 1, an energy absorbing structure 10 is designed to absorb the energy associated with an impacting object or pressure wave 11 by locally and/or globally buckling and thereby protecting the personnel, structure, and/or property within the vehicle or other structure 12 incorporating the energy absorbing structure 10. For instance, energy absorbing structures are commonly used as fail-safe mechanisms in vehicles to prevent damage to critical components of the vehicle and mitigate the harm to passengers in the event of a mechanical failure or crash.

Figure 2A:
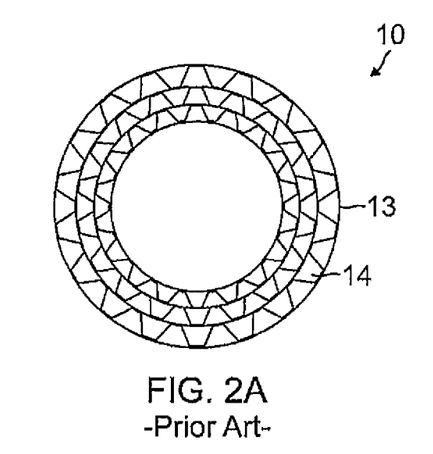
FIGS. 2A and 2B are a front view and a perspective view, respectively, of a related cylindrical energy absorbing tube having a honeycomb or corrugated core.
Figure 2B:
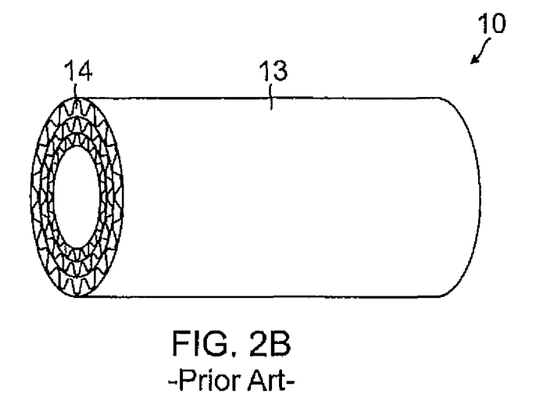

As illustrated in FIGS. 2A and 2B, related energy absorbing structures 10 are cylindrical tubes having a facesheet 13 and either a honeycomb core or a corrugated core 14 bonded to the facesheet 13. Related energy absorbing structures 10 are generally limited to cylindrical tubes because honeycomb and corrugated cores 14 cannot be formed into complex curvatures or shapes having small radius of curvature bends. However, cylindrical energy absorbing structures may not be the most efficient shape, depending upon the application of the energy absorbing structure. Additionally, related energy absorbing structures are not configured to perform additional functions, such as functioning as conduits for electrical wiring or fluid flow, because honeycomb cores have fully closed cells and corrugated cores have only unidirectionally open cells (i.e., the architecture of the related core materials is not well-suited for non-structural functions).

Related energy absorbing structures also have uniform stiffness and strength throughout the structure. The uniform stiffness and strength of related energy absorbing structures, however, do not allow for control over the buckling load, mode shape, and progression of the structure during a dynamic event, such as an impact, blast, or crash. Accordingly, related energy absorbing structures commonly incorporate one or more buckling initiation features to control the buckling load, mode shape, and progression of the structure. However, such buckling initiation features reduce the overall strength and stiffness of the structure and add to the complexity of the manufacturing process.

SUMMARY

The present disclosure is directed to various embodiments of an energy absorbing structure configured to protect personnel, structure, and/or property against impulsive loads. In one embodiment, the energy absorbing structure includes a facesheet and a micro-truss core coupled to the facesheet. The micro-truss core defines a unitary lattice structure. The facesheet and the micro-truss core are wound together into a hollow tube structure. In one embodiment, the micro-truss core includes a series of interconnected polymer optical waveguides. The micro-truss core may also be made out of any other suitable material, such as metal, metal alloy, or ceramic. The hollow tube structure may have any desired shape, such as axisymmetric shapes (e.g., a cylinder), non-axisymmetric shapes (e.g., a square prism, a rectangular prism, or a hexagonal prism), or non-prismatic shapes (e.g., a frusto-conical shape). In one embodiment, the stiffness of the micro-truss core varies axially, radially, or circumferentially along the energy absorbing structure. In one embodiment, the micro-truss core includes a first annular band having a first open volume fraction and a second annular band having a second open volume fraction less than the first open volume fraction. The energy absorbing structure may also include a sleeve coupled to an outer surface of the hollow tube structure. The energy absorbing structure may also include a housing enclosing the hollow tube structure and a plunger extending through the hollow tube structure and out through an opening in the housing. The plunger is configured to apply a compressive load on the energy absorbing structure when a tensile load is applied to the plunger.

The present disclosure is also directed to an energy absorbing structure having a first energy absorbing tubular structure and a second energy absorbing tubular structure concentrically nested in the first energy absorbing tubular structure. Both the first energy absorbing tubular structure and the second energy absorbing tubular structure include an open cellular micro-truss core coupled to a first facesheet. In one embodiment, a length of the first energy absorbing tubular structure may be different than a length of the second energy absorbing tubular structure.

The present disclosure is also directed to various methods of manufacturing an energy absorbing structure. In one embodiment, the method includes irradiating a volume of photo-monomer in a reservoir with collimated light to form a partially cured micro-truss core having a series of interconnected polymer optical waveguides and wrapping the micro-truss core and a facesheet coupled to the micro-truss core around a mandrel to form the energy absorbing structure. In one embodiment, irradiating the volume of photo-monomer includes creating a first region of the micro-truss core having a first density of polymer optical waveguides and a second region of the micro-truss core having a second density of polymer optical waveguides less than the first density of polymer optical waveguides. Irradiating the volume of photo-monomer may include irradiating a first region of the volume of photo-monomer with collimated light beams at a first angular orientation to create a first region of the micro-truss core defined by interconnected polymer optical waveguides oriented along the first angular orientation and irradiating a second region of the volume of photo-monomer with collimated light beams at a second angular orientation to create a second region of the micro-truss core defined by interconnected polymer optical waveguides oriented along the second angular orientation that is different than the first angular orientation. The method may also include applying an adhesive to a surface of the facesheet opposite the micro-truss core before wrapping the micro-truss core and the facesheet around the mandrel. The method may also include fully curing the micro-truss core prior to wrapping the micro-truss core and the facesheet around the mandrel. In another embodiment, the method may include fully curing the micro-truss core after wrapping the micro-truss core and the facesheet around the mandrel. The method may also include coating at least a portion the polymer optical waveguides with a dissimilar material before wrapping the micro-truss core and the facesheet around the mandrel. The mandrel may have any suitable shape depending upon the desired corresponding shape of the energy absorbing structure, such as axisymmetric shapes (e.g., a cylinder), non-axisymmetric shapes (e.g., a square prism, a rectangular prism, or a hexagonal prism), or non-prismatic shapes (e.g., a frusto-conical shape).

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of an energy absorbing structure configured to buckle in response to an impulsive load, such as from a ballistic impact, a percussive blast, or a crash. In this manner, the energy absorbing structures of the present disclosure may be incorporated into a vehicle or other structure to protect personnel, critical components, and/or property within the vehicle or other structure. In one or more embodiments, the energy absorbing structure includes an open cellular core. The density, strength, stiffness and/or configuration of the open cellular core may vary axially, radially, and/or circumferentially along the energy absorbing structure in order to control the buckling load, buckling initiation point, energy absorption, and collapse shape of the energy absorbing structure (i.e., the mechanical and physical properties of the energy absorbing structures of the present invention may be spatially tailored to control the deformation and buckling of the energy absorbing structure in response to an impulsive load). Additionally, an energy absorbing structure having an open cellular core with varying physical and mechanical properties may be configured to mitigate the damage resulting from a range of different impulsive loads (e.g., from low speed pedestrian impacts to high speed vehicular crashes). Furthermore, in one or more embodiments, the open cellular core of the energy absorbing structure does not limit the potential shapes of the energy absorbing structure and therefore the energy absorbing structures may have any desired shape depending upon the intended application and desired performance characteristics of the energy absorbing structure.

Figure 3A:
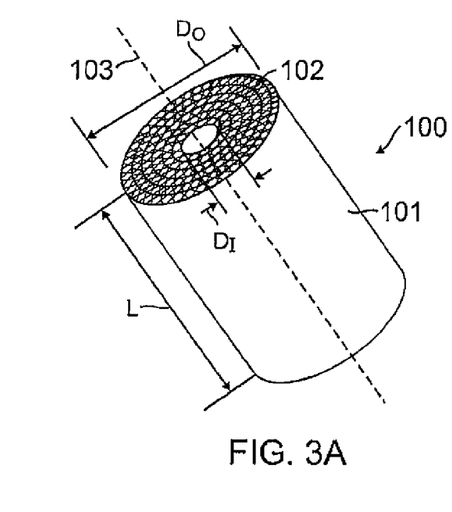
FIGS. 3A and 3B are a perspective view and a front view, respectively, of an energy absorbing structure according to one embodiment of the present disclosure.
Figure 3B:
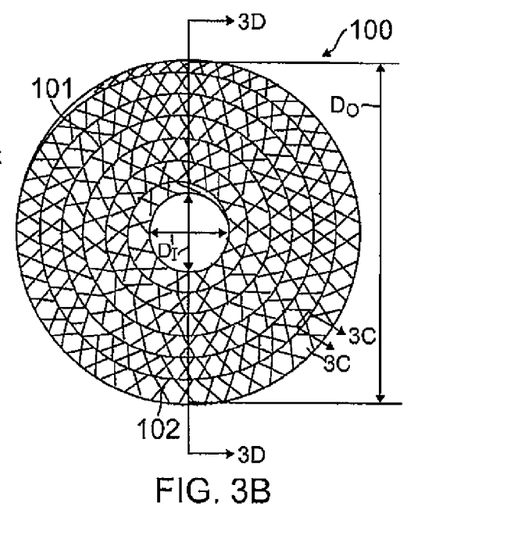
Figure 3C:
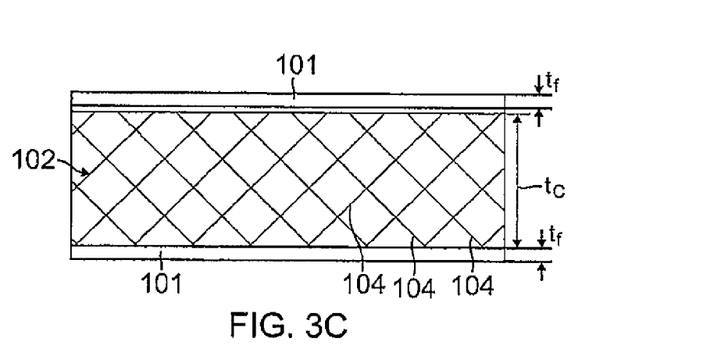
FIGS. 3C and 3D are cross-sectional views of the energy absorbing structure of FIG. 3B.
Figure 3D:
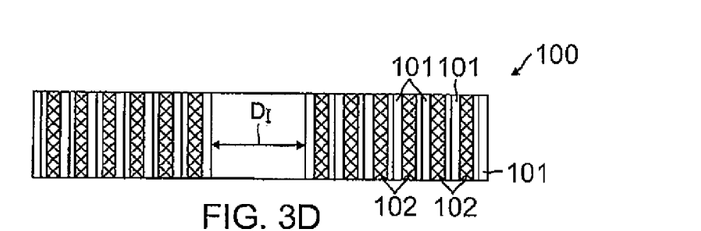

With reference now to FIGS. 3A and 3B, an energy absorbing structure 100 according to one embodiment of the present disclosure includes a facesheet 101 and an open cellular core 102 coupled to the facesheet 101. In the illustrated embodiment, the facesheet 101 and the open cellular core 102 are wound together into a hollow cylindrical roll or tube. The energy absorbing structure 100 may have any size suitable for the desired performance characteristics of the energy absorbing structure 100 and the intended application of the energy absorbing structure 100. For instance, the energy absorbing structure 100 may have a length L from approximately or about ¼ inch to approximately or about 20 inches, an outer diameter $D_O$ from approximately 1 inch to approximately 24 inches, and an inner diameter $D_I$ from approximately ½ inch to approximately 8 inches. Additionally, as illustrated in FIG. 3C, the facesheet 101 may have any thickness $t_f$ suitable for the desired performance characteristics of the energy absorbing structure 100, such as, for instance, from approximately 0.01 inch to approximately 0.04 inch. Similarly, the open cellular core 102 may have any thickness $t_c$ suitable for the desired performance characteristics of the energy absorbing structure 100 (e.g., buckling response, energy absorption) and the intended application of the energy absorbing structure 100, such as, for instance, from approximately 0.03 inch to approximately 1 inch. The facesheet 101 may be made from any suitable material, such as, for instance, metal, metal alloy (e.g., aluminum alloy), or a polymer matrix composite. Additionally, in the illustrated embodiment, the energy absorbing structure 100 has seven layers (i.e., the facesheet 101 and the open cellular core 102 extend seven complete revolutions around a longitudinal axis 103 of the energy absorbing structure 100), although in one or more alternate embodiments, the energy absorbing structure 100 may have any other suitable number of layers, such as, for instance, from one to ten layers.

In the illustrated embodiment, the open cellular core 102 includes a plurality of interconnected truss elements 104 (e.g., a plurality of interconnected polymer optical waveguides) arranged in a unitary lattice structure. In one embodiment, the truss elements 104 are arranged and oriented into an array of octahedral unit cells (i.e., the unitary lattice structure includes a series of octahedral unit cells), although in one or more alternate embodiments, the truss elements 104 may be arranged and oriented into any other suitable configurations, such as, for instance, an array of hexahedral unit cells. The open cellular core 102 is also referred to herein as "a micro-truss core" or "an ordered three-dimensional microstructure core." The truss elements 104 (e.g., the polymer optical waveguides) may have any suitable spacing, orientation, size, and cross-sectional shape depending upon the desired performance characteristics of the energy absorbing structure 100. Additionally, the spacing, orientation, size, and/or cross-sectional shape of the polymer optical waveguides 104 may vary axially (Z), radially (R), and/or circumferentially (θ) along the open cellular core 102 such that the buckling response of the energy absorbing structure 100 may be designed to suit a particular application (i.e., the mechanical properties of the open cellular core 102 are spatially tailored to achieve a desired buckling response of the energy absorbing structure 100 in response to a range of different impulsive loads). Varying the strength and stiffness of the open cellular core 102 enables the energy absorbing structure 100 to have a plurality of different buckling responses when the impulsive load acting on the energy absorbing structure 100 exceeds one or more thresholds. For instance, in one embodiment, the open cellular core 102 of the energy absorbing structure 100 may include alternating annular bands of relatively stiffer core sections (e.g., portions having a relatively higher density of polymer optical waveguides 104) and relatively weaker core sections (e.g., portions having a relatively lower density of polymer optical waveguides 104) spaced along the length L of the open cellular core 102. In this embodiment, only the relatively weaker annular bands of the open cellular core 102 may be configured to buckle or crush in a low energy event (e.g., a low speed pedestrian accident) and both the relatively weaker annular bands and the relatively stiffer annular bands of the open cellular core 102 may be configured to buckle in a higher energy event (e.g., a vehicle on vehicle accident).

Although the open cellular core 102 in the illustrated embodiment is formed from a plurality of interconnected polymer optical waveguides 104, the open cellular core 102 may be made from any other suitable material based upon the desired properties of the open cellular core 102, such as, for instance, the chemical or bio-compatibility of the open cellular core 102, the operational service temperature range of the open cellular core 102, the compressive stiffness of the open cellular core 102, the mechanical durability (i.e., fatigue resistance) of the open cellular core 102, the aesthetics of the open cellular core 102, and/or the hydrophobic or hydrophilic properties of the open cellular core 102. For instance, the open cellular core 102 may be made from metal, metal alloy, ceramic, or any combination thereof.

Figure 4A:
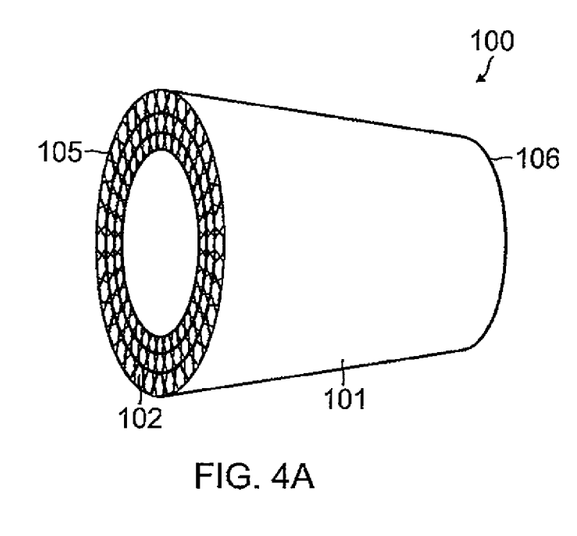
FIGS. 4A-4C are a perspective view, a front view, and a rear view, respectively, of an energy absorbing structure according to another embodiment of the present disclosure.
Figure 4B:
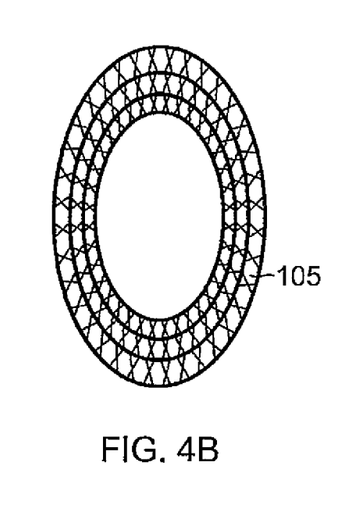
Figure 4C:
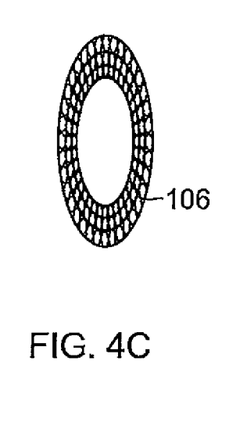

In one or more alternate embodiments, the energy absorbing structure 100 may have any other suitable shape, including axisymmetric shapes, non-axisymmetric shapes, prismatic shapes, and non-prismatic shapes. For instance, as illustrated in FIGS. 4A-4C, the energy absorbing structure 100 may taper between a relatively larger elliptical upper end 105 and a relatively smaller elliptical lower end 106 such that the energy absorbing structure 100 has a substantially frusto-conical shape. In one or more alternate embodiments, the energy absorbing structure 100 may have any other shape suitable for the intended application of the energy absorbing structure 100, such as, for instance, a square prism, a rectangular prism, or a hexagonal prism. Additionally, in one or more embodiments, the energy absorbing structure 100 may taper at any suitable angle α relative to a longitudinal axis 107 of the energy absorbing structure 100, such as, for instance, from approximately 5 degrees to approximately 60 degrees.

Figure 5:
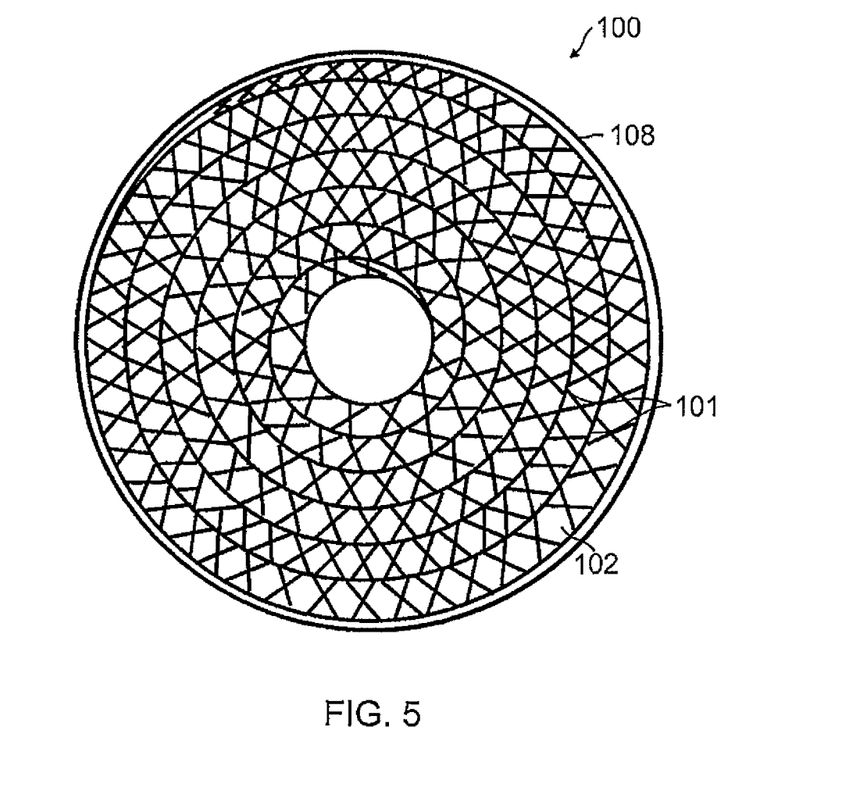
FIG. 5 is a front view of an energy absorbing structure according to a further embodiment of the present disclosure.

With reference now to FIG. 5, in one or more embodiments, an overwrap or compression sleeve 108 may be coupled to an outer surface of the energy absorbing structure 100. The compression sleeve 108 is configured to prevent excessive outward radial deformation of the energy absorbing structure 100 when the energy absorbing structure 100 buckles under the force from an impulsive load. The compression sleeve 108 may be made of any suitable materials, such as metal, metal alloy (e.g., aluminum alloy), or a polymer matrix composite. In one embodiment, the compression sleeve 108 may be made out of the same or similar material as the facesheet 101, although in one or more alternate embodiments, the compression sleeve 108 and the facesheet 101 may be made out of dissimilar materials.

Figure 6A:
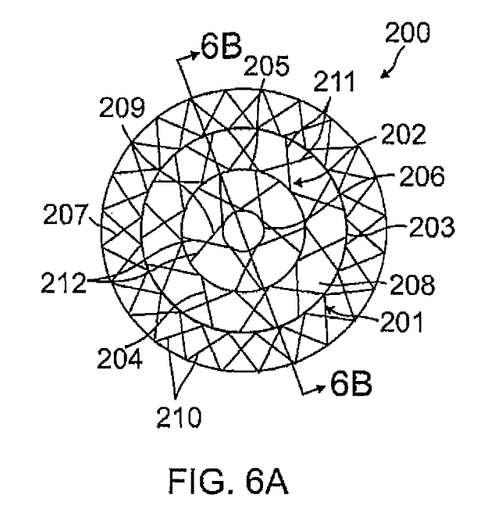
FIGS. 6A and 6B are a front view and a cross-sectional view, respectively, of an energy absorbing structure according to another embodiment of the present disclosure.
Figure 6B:
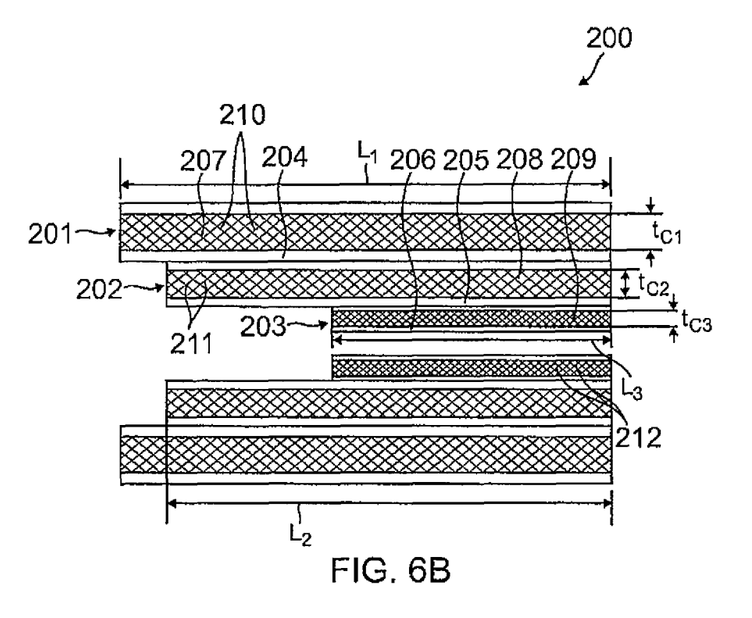

With reference now to FIGS. 6A and 6B, an energy absorbing structure 200 according to another embodiment of the present disclosure includes a plurality of concentrically nested secondary or complimentary energy absorbing structures 201, 202, 203. Each of the secondary energy absorbing structures 201, 202, 203 includes a facesheet 204, 205, 206 and an open cellular core 207, 208, 209 having a plurality of interconnected polymer optical waveguides 210, 211, 212 coupled to the respective facesheet 204, 205, 206. Each of the secondary energy absorbing structures 201, 202, 203 is also wound into a hollow tubular structure. In the illustrated embodiment, the secondary energy absorbing structures 201, 202, 203 are cylindrical, although in one or more alternate embodiments, the secondary energy absorbing structures 201, 202, 203 may have any other shape suitable for the intended application of the energy absorbing structure 200, such as, for instance, axisymmetric shapes (e.g., a cylinder), non-axisymmetric shapes (e.g., a square prism, a rectangular prism, or a hexagonal prism), or non-prismatic shapes (e.g., a frusto-conical shape). Additionally, the density, strength, stiffness and/or configuration of one or more of the open cellular cores 207, 208, 209 may vary axially, radially, and/or circumferentially along the respective secondary energy absorbing structure 201, 202, 203 depending upon the desired performance characteristics of the energy absorbing structure 200.

In the illustrated embodiment of FIGS. 6A and 6B, the energy absorbing structure includes an outer secondary energy absorbing structure 201, an intermediate secondary energy absorbing structure 202 nested concentrically within the outer secondary energy absorbing structure 201, and an inner energy absorbing structure 203 nested concentrically within the intermediate secondary energy structure 202. Although in the illustrated embodiment the energy absorbing structure 200 includes three secondary energy absorbing structures 201, 202, 203, in one or more alternate embodiments, the energy absorbing structure 200 may include any other suitable number of secondary energy absorbing structures, such as, for instance, from two to ten.

Additionally, in the illustrated embodiment of FIG. 6B, the outer secondary energy absorbing 201 structure has a length $L_1$, the intermediate secondary energy absorbing structure 202 has a length $L_2$ less than the length $L_1$ of the outer secondary energy absorbing structure 201, and the inner secondary energy absorbing structure 203 has a length $L_3$ less than the length $L_2$ of the intermediate energy absorbing structure 202. In one or more alternate embodiments, the outer, intermediate, and inner secondary energy absorbing structures 201, 202, 203, respectively, may have any other suitable combination of relative lengths $L_1$, $L_2$, $L_3$. Additionally, although in the illustrated embodiment the secondary energy absorbing structures 201, 202, 203 each have a different length $L_1$, $L_2$, $L_3$, in one or more alternate embodiments, two or more of the secondary energy absorbing structures may have the same or substantially the same length. Similarly, the open cellular cores 207, 208, 209 of the secondary energy absorbing structures 201, 202, 203 may have any suitable combination of relative thicknesses $t_{c1}$, $t_{c2}$, $t_{c3}$. For instance, in the illustrated embodiment, the open cellular core 207 of the outer secondary energy absorbing 201 structure has a thickness $t_{c1}$, the open cellular core 208 of the intermediate secondary energy absorbing structure 202 has a thickness $t_{c2}$ less than the thickness $t_{c1}$ of the open cellular core 207 of the outer secondary energy absorbing structure 201, and the open cellular core 209 of the inner secondary energy absorbing structure 203 has a thickness $t_{c3}$ less than the thickness $t_{c2}$ of the open cellular core 208 of the intermediate energy absorbing structure 202. The secondary energy absorbing structures 201, 202, 203 may be coupled together by any suitable processes or mechanisms, such as, for instance, bonding, welding (e.g., inert gas welding, linear friction welding, vibration welding, or friction-stir welding), brazing, mechanical fastening, or any combination thereof.

An energy absorbing structure 200 having a plurality of nested secondary energy absorbing structures 201, 202, 203 may be tailored to achieve a more complex buckling response to an impulsive load and to adequately absorb the energy from a wider range of impulsive loads than a single energy absorbing structure. For instance, in the illustrated embodiment of FIGS. 6A and 6B, only the outer secondary energy absorbing 201 structure may be configured to buckle in response to a relatively low energy impulsive load, both the outer and intermediate secondary energy absorbing structures 201, 202, respectively, may be configured to buckle in response to a relatively higher energy impulsive load, and each of the outer, intermediate, and inner secondary energy absorbing structures 201, 202, 203, respectively, may be configured to buckle in response to a relatively high energy impulsive load.

Figure 7A:
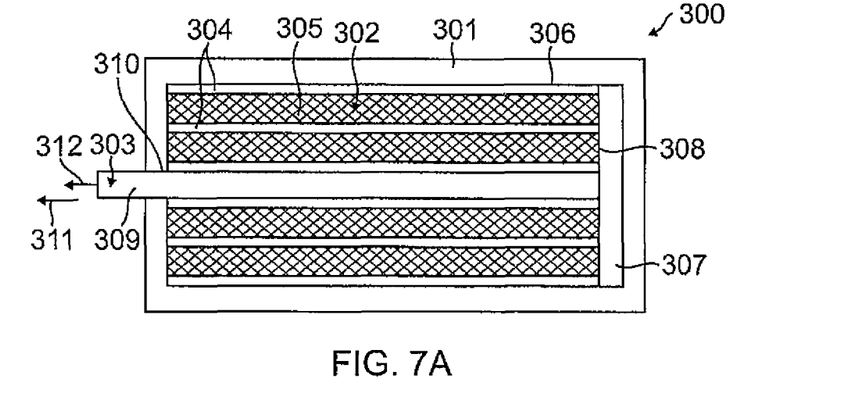
FIGS. 7A and 7B are cross-sectional views of an energy absorbing structure incorporated into a plunger device according to one embodiment of the present disclosure.
Figure 7B:
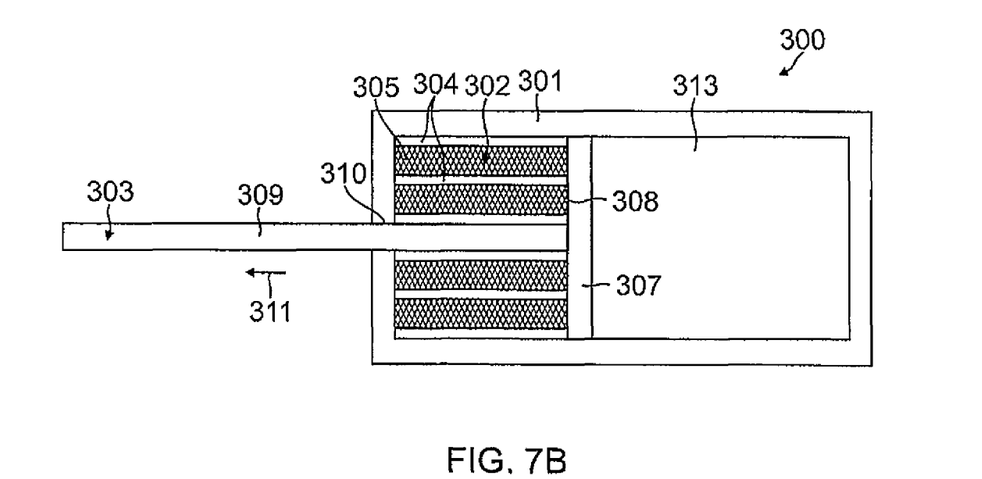

With reference now to FIGS. 7A and 7B, a tensile energy absorbing system 300 according to one embodiment of the present disclosure includes an enclosure or housing 301, an energy absorbing structure 302 housed in an interior cavity defined by the housing 301, and a plunger 303 configured to engage the energy absorbing structure 302. In the illustrated embodiment, the energy absorbing structure 302 includes a facesheet 304 and an open cellular micro-truss core 305 coupled to the facesheet 304. As described above, the energy absorbing structure 302 may be wound into any suitable tubular shape, such as, for instance, a cylinder, a square prism, a rectangular prism, a hexagonal prism, or a frusto-conical shape. Additionally, in one or more embodiments, the energy absorbing structure 302 may taper at any suitable angle between a relatively wider end and a relatively narrower end. The density, strength, stiffness and/or configuration of the open cellular core 305 may vary axially, radially, and/or circumferentially along the energy absorbing structure 302 depending upon the desired performance characteristics of the tensile energy absorbing system 300. In the illustrated embodiment, the housing 301 substantially conforms to an outer surface 306 of the energy absorbing structure 302, although in one or more alternate embodiments, the housing 301 may not conform to the outer surface 306 of the energy absorbing structure 302.

In the illustrated embodiment of FIGS. 7A and 7B, the plunger 303 includes a base member or plate 307 abutting against one end 308 of the energy absorbing structure 302 and an arm or shaft 309 extending outward from the base plate 307 and through an opening 310 in the housing 301. The plunger 303 is configured to translate (arrow 311) between a stowed position (FIG. 7A) and a deployed position (FIG. 7B) when a tensile load (arrow 312) acts upon the shaft 309 of the plunger 303. When the plunger 303 is in the stowed position, the energy absorbing structure 302 is uncompressed. When the plunger 303 is in the deployed position, the energy absorbing structure 302 is at least partially compressed or buckled such that an empty volume 313 is defined in a portion of the interior cavity of the housing 301 that was previously occupied by the uncompressed energy absorbing structure 302. Accordingly, it will be appreciated that the plunger 303 is configured to engage the energy absorbing structure 302 such that the energy absorbing structure 302 buckles and thereby absorbs the energy from the tensile load (arrow 312) acting on the shaft 309 of the plunger 303. The absorption of energy by the energy absorbing structure 302 arrests the translation (arrow 311) of the plunger 303 and limits the maximum potential translation (arrow 311) of the plunger 303.

The energy absorbing structures 100, 200, 300 of the present disclosure may be incorporated into any suitable component or system in which it is desirable to absorb the energy from an impulsive load, such as, for instance, automotive crush rails or crush cans, automotive steering columns, automotive A- or B-pillars, crash barriers installed along the sides of highways or bridges, aerospace vehicles (e.g., blast resistant transport vehicles) or structures to protect personnel and/or electronics (e.g., munitions guidance electronics), aircraft landing gears to prevent over-travel of the landing gear during landing, shoe insoles, seat padding, compliant grips on sporting equipment (e.g., racquets, clubs, or bats), or as a backup fail-safe mechanism in shear couplers connecting railway cars together.

The open cellular micro-truss cores 102, 207, 208, 209, 305 of the energy absorbing structures 100, 200, 300 of the present disclosure facilitate the use or utilization of the energy absorbing structures 100, 200, 300 for additional functions beyond energy absorption. For instance, the energy absorbing structures 100, 200, 300 may be used as a conduit for fluid flow, hydraulic pipes, and/or electrical wires to electrically or hydraulically couple components at the top, bottom, inner surface, and/or outer surface of the energy absorbing structure. Additionally, one or more manifolds may be attached to top, bottom, inner, and/or outer surfaces of the energy absorbing structure 100, 200, 300 to introduce and direct a fluid (e.g., air or liquid) to flow through the open cellular core 102, 207, 208, 209, 305. For instance, fluid may be directed through the open cellular core 102, 207, 208, 209, 305 such that the energy absorbing structure 100, 200, 300 may also function as a heat exchanger, a heat pipe, a cold plate, or a vent.

Figure 8A:
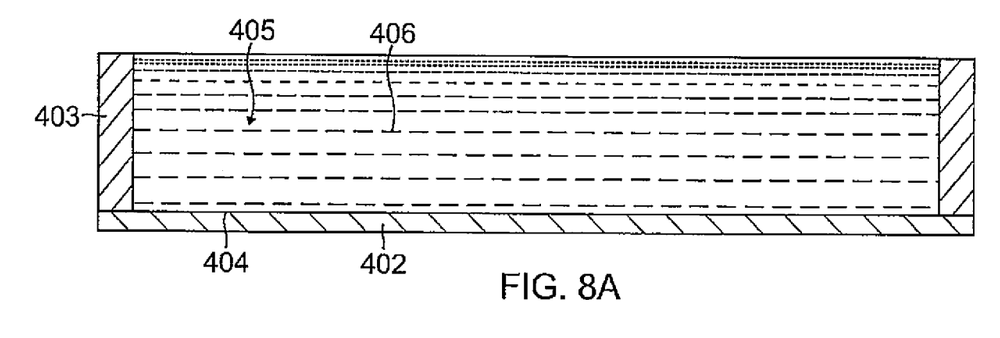
FIG. 8A illustrates a task of applying a mold to a facesheet to form a reservoir and a task of filling the reservoir with a volume of photo-monomer according to one embodiment of the present disclosure.
Figure 9:
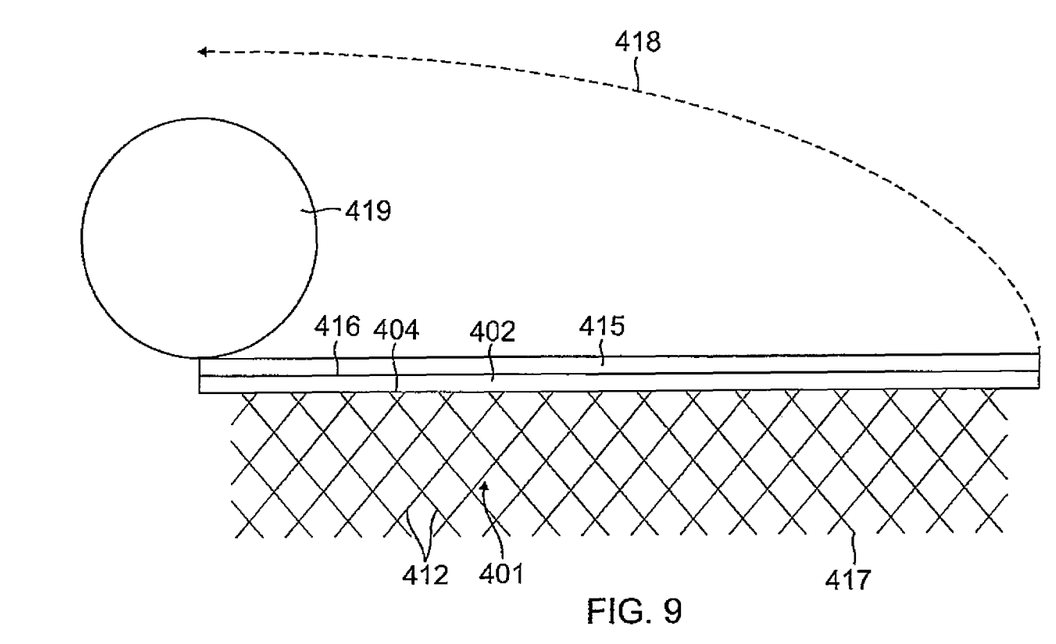
FIG. 9 illustrates a task of winding the open cellular core and the facesheet of FIG. 8D around a mandrel to form an energy absorbing structure according to one embodiment of the present disclosure.

With reference now to FIGS. 8A-9, a method of manufacturing a tubular energy absorbing structure 400 having an open cellular micro-truss core 401 coupled to a facesheet 402 will be described. As illustrated in FIG. 8A, the method includes a task of forming a mold 403 around a periphery of an outer surface 404 of the facesheet 402. Together, the mold 403 and the facesheet 402 define a reservoir 405. The method also includes a task of filling the reservoir 405 with a volume of liquid photo-monomer 406 that is configured to polymerize when exposed to light within a particular range of wavelengths, such as, for instance, ultraviolet light (i.e., wavelengths between 250 nm and 400 nm). The liquid photo-monomer 406 may be any suitable type of monomer configured to polymerize when exposed to light, such as, for instance, urethanes (e.g., polyurethanes), acrylates, methacrylates, or cationic polymers (e.g., photo-cured epoxies).

Figure 8B:
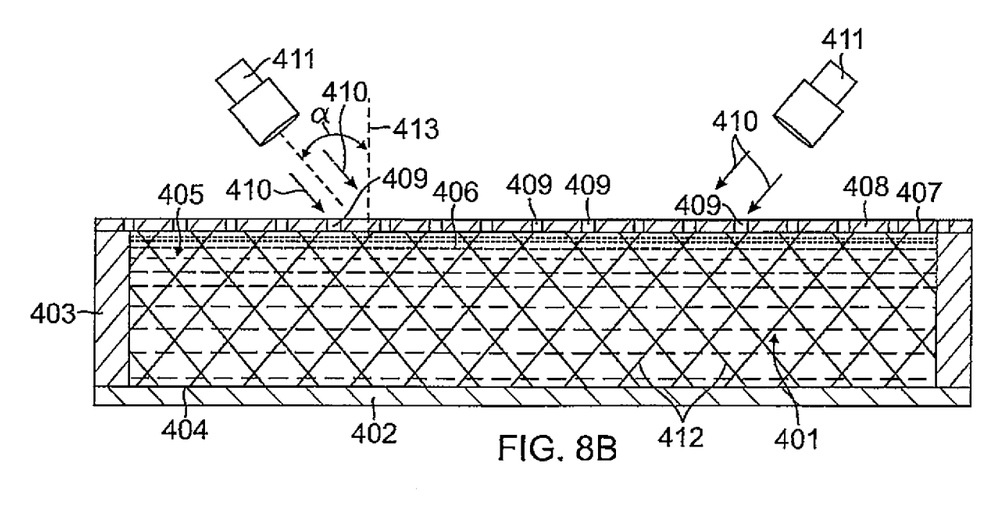
FIG. 8B illustrates a task of covering the mold with a mask and a task of irradiating the volume of liquid photo-monomer with a plurality of collimated light beams to form an open cellular core according to one embodiment of the present disclosure.

With reference now to the embodiment illustrated in FIG. 8B, the method also includes a task of covering an upper end 407 of the reservoir 405 with a mask 408. The mask 408 defines a plurality of apertures 409. The mask 408 may define any desired number of apertures 409 and the apertures 409 may have any desired size, shape, and spacing, depending upon the desired characteristics of the open cellular micro-truss core 401, as described below in more detail. The mask 408 may be made of any suitable material, such as, for instance, biaxially-oriented polyethylene terephthalate.

Still referring to the embodiment illustrated in FIG. 8B, the method also includes a task of irradiating the volume of photo-monomer 406 in the reservoir 405 with a plurality of collimated light beams 410 (e.g., ultraviolet light ("UV") beams) from one or more light sources 411. The task of irradiating the photo-monomer 406 includes directing the collimated light beams 410 from the one or more light sources 411 down through the apertures 409 in the mask 408. Regions of the liquid photo-monomer 406 that are exposed to the collimated light beams 410 cure (i.e., polymerize). The polymerized regions propagate down through the volume of photo-monomer 406 and form a plurality of polymer optical waveguides 412. In one embodiment, the polymer optical waveguides 412 intersect each other and are polymerized together into a unitary, ordered lattice structure. Together, the polymer optical waveguides 412 define the open cellular micro-truss core 401 of the tubular energy absorbing structure 400. Suitable methods for forming polymer optical waveguides are described in U.S. Pat. Nos. 7,653,279 and 7,382,959, the entire content of both of which are incorporated herein by reference.

In one embodiment, the method includes a task of spatially tailoring the mechanical properties of the open cellular micro-truss core 401 to achieve a desired buckling response (e.g., buckling initiation point, collapse shape) of the energy absorbing structure 400 in response to a range of different impulsive loads. For instance, the strength and stiffness of the open cellular core 401 may vary axially, radially, and/or circumferentially around the energy absorbing structure 400 (e.g., localized regions of the open cellular core 401 may be stronger and stiffer than other regions of the open cellular core 401). In one embodiment, the method includes forming an open cellular core 401 having alternating annular bands of relatively stronger core sections and relatively weaker core sections along a length of the tubular energy absorbing structure 400. The strength and stiffness of the open cellular core 401 is a function of several factors, including the orientation of the polymer optical waveguides 412, the cross-sectional shape and size of the polymer optical waveguides 412, and the spacing between the polymer optical waveguides 412 (i.e., the density of the polymer optical waveguides 412 in the open cellular core 401). Accordingly, in one or more embodiments, the method may include one or more tasks for varying the orientation, shape, size, and/or spacing of the polymer optical waveguides 412 of the open cellular core 401.

The orientation of the polymer optical waveguides 412 of the open cellular core 401 depends on the direction in which the polymer optical waveguides 412 propagate through the volume of photo-monomer 406. The direction in which the polymer optical waveguides 412 propagate through the volume of photo-monomer 406 is a function of an incident angle α of the one or more light sources 411 and the collimated light beams 410 produced therefrom relative to an imaginary axis 413 perpendicular to the mask 408 (i.e., the orientation of the polymer optical waveguides 412 is a function of the angles α at which the one or more collimated light beams 410 strike the volume of photo-monomer 406 in the reservoir 405). Accordingly, in one embodiment, the method may include a task of positioning the one or more light sources 411 at one or more different angles α and directing one or more light beams 410 through the apertures 409 in the mask 408 at each of the different angles α. The method may include positioning the light sources 411 into any suitable number of different incident angles α, such as, for instance, from two to ten different angular positions. Additionally, in one or more embodiments, the method may include varying the incident angles α of the light beams 410 at different locations along the mask 408 such that the orientation of the polymer optical waveguides 412 varies along the tubular energy absorbing structure 400, such as, for instance, axially, radially, and/or circumferentially along the energy absorbing structure 400. The light sources 411 may be any suitable kind of lamps capable of emitting light beams 410 within a range of wavelengths configured to polymerize the liquid photo-monomer 406, such as, for instance, mercury arc lamps.

The cross-sectional shape and size of the polymer optical waveguides 412 is a function of the shape and size of the collimated light beams 410 striking the volume of photo-monomer 406. The cross-sectional shape and size of the collimated light beams 410 striking the photo-monomer 406 are dependent upon the shape and size of the apertures 409 in the mask 408. The apertures 409 in the mask 408 may have any desired shape, such as, for instance, circular, triangular, pentagonal, hexagonal, polygonal, oval, or star-shaped. Accordingly, the method may also include a task of selecting a mask 408 having apertures 409 with a shape and size corresponding to the desired cross-sectional shape and size of the polymer optical waveguides 412 of the open cellular micro-truss core 401. Additionally, in one or more embodiments, the method may include a task of selecting a mask 408 having a plurality of apertures 409 that vary in shape and/or size across the mask 408. Accordingly, when the collimated light beams 410 are directed through the apertures 409 and into the volume of the photo-monomer 406 to form the polymer optical waveguides 412, the shape and/or size of the polymer optical waveguides 412 varies along the tubular energy absorbing structure 400, such as, for instance, axially, radially, and/or circumferentially along the energy absorbing structure 400.

The spacing between the polymer optical waveguides 412 (i.e., the density of the polymer optical waveguides 412 in the open cellular micro-truss core 401) and the open volume fraction of the open cellular core 401 (i.e., the volume ratio of air to polymer optical waveguides 412 in the open cellular core 401) are a function of the spacing between the apertures 409 in the mask 408 and the number of collimated light beams 410 directed through the apertures 409. In one or more embodiments, the method includes a task of selecting a mask 408 wherein the spacing between the apertures 409 varies across the mask 408 (e.g., selecting a mask 408 having one or more sets of apertures 409 that are more closely spaced together than a remainder of the apertures 409). Accordingly, when the collimated light beams 410 are directed through the apertures 409 and into the volume of photo-monomer 406 to form the polymer optical waveguides 412, the spacing between the polymer optical waveguides 412 varies along the tubular energy absorbing structure 400, such as, for instance, axially, radially, and/or circumferentially along the energy absorbing structure 400 (e.g., the spacing between the polymer optical waveguides 412 formed from the collimated light beams 410 directed through the more closely spaced apertures 409 in the mask 408 may be closer than the spacing between the polymer optical waveguides 412 formed from the collimated light beams 410 directed through the remainder of the apertures 409 in the mask 408).

According to another embodiment, the method may include a task of selecting a mask 408 having a uniform, equidistant pattern of apertures 409 and directing a greater number of collimated light beams 410 through some of the apertures 409 than a remainder of the apertures 409 such that the spacing between the polymer optical waveguides 412 varies along the energy absorbing structure 400, such as, for instance, axially, radially, and/or circumferentially along the energy absorbing structure 400. In a further embodiment, the method may include a task of both selecting a mask 408 wherein the spacing between the apertures 409 varies across the mask 408 and directing a greater number of collimated light beams 410 through the more closely spaced apertures 409 than the remainder of the apertures 409 to form an open cellular micro-truss core 401 wherein the spacing between the polymer optical waveguides 412 varies along the energy absorbing structure 400.

With continued reference to the embodiment illustrated in FIG. 8B, the length to which the polymer optical waveguides 412 propagate through the volume of photo-monomer 406 in the reservoir 405 is a function of several factors, including the size, intensity, and exposure time of the incident light beams 410 and the light absorption/transmission properties of the liquid photo-monomer 406. Accordingly, in one embodiment, the method includes a task of selecting one or more light sources 411 configured to produce light beams 410 having a suitable intensity and exposing the volume of photo-monomer 406 in the reservoir 405 to the light beams 410 for a sufficient duration such that the polymer optical waveguides 412 propagate all the way down through the reservoir 405 and adhere to the outer surface 404 of the facesheet 402. In one embodiment in which the reservoir 405 has a depth of approximately 6 mm, the method includes irradiating the volume of photo-monomer 406 with collimated UV light beams 410 having an intensity of 3 mW/cm$^2$ for approximately 100 seconds. It will be appreciated, however, that the method may include selecting one or more light sources 411 configured to produce light beams 410 having any other suitable intensity and irradiating the photo-monomer 406 for any other suitable duration depending upon the depth of the reservoir 405 and the desired length of the polymer optical waveguides 412. In an embodiment in which the polymer optical waveguides 412 do not propagate all the way through the reservoir 405 and adhere to the outer surface 404 of the facesheet 402, the method may include a task of coupling a lower end 414 of the polymer optical waveguides 412 to the outer surface 404 of the facesheet 402. The task of coupling the polymer optical waveguides 412 to the outer surface 404 of the facesheet 402 may be performed by any suitable process, such as, for instance, bonding, welding, soldering, brazing, or any combination thereof.

The method may also include a task of preparing the outer surface 404 of the facesheet 402 prior to adhering the polymer optical waveguides 412 to the outer surface 404 of the facesheet 402. In an embodiment in which the polymer optical waveguides 412 propagate all the way through the reservoir 405 and adhere to the outer surface 404 of the facesheet 402, the task of preparing the outer surface 404 of the facesheet 402 may be performed before the tasks of forming the mold 403 on the facesheet 402 and filling the reservoir 405 with a volume of photo-monomer 406, as illustrated in FIG. 8A. In an embodiment in which the polymer optical waveguides 412 do not propagate all the way through the reservoir 405 and adhere to the outer surface 404 of the facesheet 402, the task of preparing the outer surface 404 of the facesheet 402 may be performed after the open cellular micro-truss core 401 has been formed. Preparing the outer surface 404 of the facesheet 402 is configured to increase the strength of the bond between the polymer optical waveguides 412 and the facesheet 402. The outer surface 404 of the facesheet 402 may be prepared by any suitable process, such as, for instance, cleaning, sanding, etching, degreasing, oxidizing, applying a conversion coating, applying a functional coating, or any combination thereof. In one or more alternate embodiments, the method may include a task of obtaining or providing a facesheet 402 that has been pre-prepared according to any suitable process.

Figure 8C:
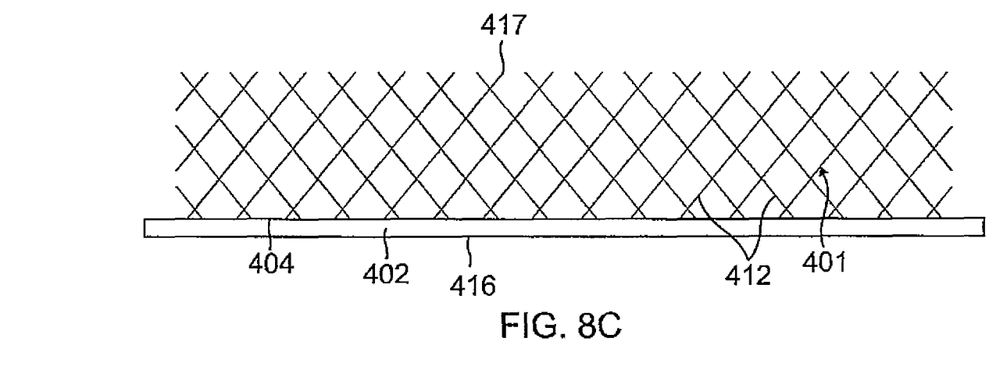
FIG. 8C illustrates a task of removing the mask and the mold and a task of removing uncured photo-monomer according to one embodiment of the present disclosure.

With reference now to the embodiment illustrated in FIG. 8C, the method may also include a task of removing unpolymerized photo-monomer 406 from the reservoir 405, thereby leaving the polymer optical waveguides 412 defining the open cellular micro-truss core 401 (i.e., the method may include a task of removing the photo-monomer 406 from the reservoir 405 that was not polymerized into the polymer optical waveguides 412 during the task of irradiating the volume of liquid photo-monomer 406 in the reservoir 405 with the collimated light beams 410). The task of removing the unpolymerized photo-monomer 406 from the reservoir 405 may be performed by any suitable process, such as, for instance, applying a solvent that dissolves the unpolymerized photo-monomer 406 but not the polymer optical waveguides 412. As illustrated in FIG. 8C, the method may also include a task of removing the mask 408 and the mold 403 following the task of irradiating the volume of photo-monomer 406 with the plurality of collimated light beams 410.

Figure 8D:
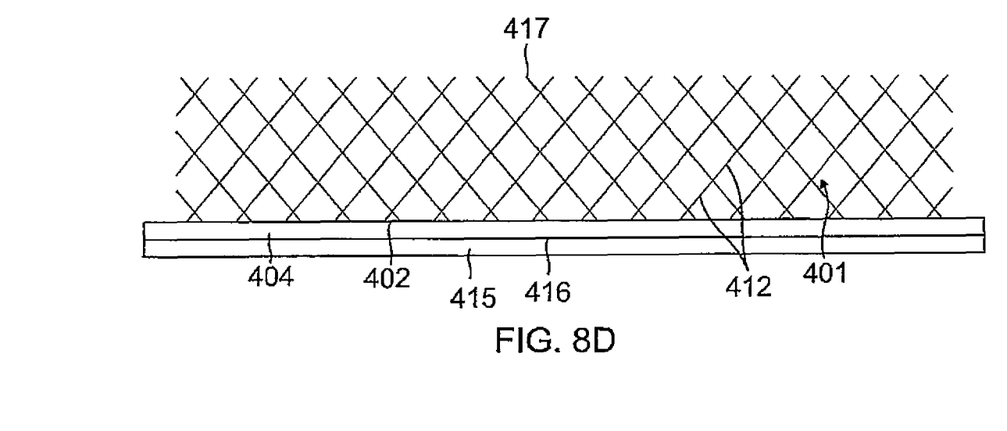
FIG. 8D illustrates a task of applying an adhesive layer to a lower surface of the facesheet according to one embodiment of the present disclosure.

With reference now to the embodiment illustrated in FIG. 8D, the method includes a task of applying a layer of adhesive 415 to an inner surface 416 of the facesheet 402 opposite the outer surface 404 of the facesheet 402 onto which the open cellular micro-truss core 401 is adhered. As described in more detail below, the adhesive 415 is configured to couple the facesheet 402 to an upper end 417 of the open cellular micro-truss core 401 when the facesheet 402 and the open cellular micro-truss core 401 are wound together into a hollow tubular structure. The adhesive 415 may be any suitable type of adhesive, such as, for instance, a thermally-curable adhesive or a UV-curable adhesive.

In one embodiment, the polymer optical waveguides 412 remain in a partially cured state following the task of irradiating the volume of photo-monomer 406 with a plurality of collimated light beams 410. In the partially cured state, the open cellular micro-truss core 401 (i.e., the polymer optical waveguides 412) is relatively pliant such that the open cellular micro-truss core 401 can be formed into a variety of different shapes, including complex shapes and shapes having small radius of curvature bends, without damaging (e.g., crushing) the open cellular micro-truss core 401. With reference now to the embodiment illustrated in FIG. 9, the method includes a task of winding or wrapping (arrow 418) the facesheet 402 and the open cellular micro-truss core 401 around a mandrel 419 to form the facesheet 402 and the open cellular micro-truss core 401 into a hollow tubular structure. The facesheet 402 and open cellular micro-truss core 401 may be wrapped around the mandrel 419 any suitable number of times depending upon the intended application of the energy absorbing structure 400 and the desired performance characteristics of the energy absorbing structure 400, such as, for instance, from one to ten complete revolutions around the mandrel 419. Additionally, the mandrel 419 may have any suitable shape depending on the desired corresponding shape of the energy absorbing structure 400, such as, for instance, axisymmetric shapes (e.g., a cylinder) or non-axisymmetric shapes (e.g., a square prism, a rectangular prism, or a hexagonal prism). Additionally, in one or more embodiments, the mandrel 419 may be non-prismatic (e.g., frusto-conical). In one or more embodiments, the mandrel 419 may also taper at any suitable angle θ relative to a longitudinal axis of the mandrel 419, such as, for instance, from approximately 5 degrees to approximately 60 degrees, depending upon the desired taper of the energy absorbing structure 400. When the facesheet 402 and the open cellular micro-truss core 401 are wound (arrow 418) together around the mandrel 419, the adhesive 415 on the inner surface 416 of the facesheet 402 adheres the facesheet 402 to the upper end 417 of the open cellular micro-truss core 401 and thereby maintains the energy absorbing structure 400 in the desired tubular shape.

According to one embodiment of the present disclosure, the method of manufacturing the tubular energy absorbing structure 400 includes a task of fully curing the polymer optical waveguides 412 of the open cellular micro-truss core 401 after the facesheet 402 and the open cellular micro-truss core 401 have been wound (arrow 418) together around the mandrel 419 into the desired hollow tubular structure. In one embodiment, the task of fully curing the polymer optical waveguides 412 includes irradiating the polymer optical waveguides 412 with light (e.g., UV light) to fully cross-link the polymer waveguides 412. The method may also include a task of curing the adhesive 415 after the facesheet 402 and the open cellular micro-truss core 401 have been wound around the mandrel 419 into the desired hollow tubular structure. In one embodiment, the task of curing the adhesive 415 includes thermally curing the adhesive 415. In an embodiment in which the facesheet 402 is made from a UV-transparent material and the adhesive 415 is UV-curable, the task of curing the adhesive 415 may occur during the task of fully curing the polymer optical waveguides 412 with UV light. In an alternate embodiment, the polymer optical waveguides 412 may be fully cured in a flat state by irradiating the polymer optical waveguides 412 with light before the facesheet 402 and the open cellular micro-truss core 401 are wrapped (arrow 418) around the mandrel 419 into the desired hollow tubular structure. An open cellular core 401 having fully cured polymer optical waveguides 412 is more resistant to crushing during the task of wrapping the open cellular micro-truss core 401 and the facesheet 402 around the mandrel 419 than an otherwise equivalent open cellular core having partially cured polymer optical waveguides.

Although the open cellular cores 401 formed according to the methods described above include a plurality of polymer optical waveguides 412, in one or more alternate embodiments, the method may include one or more tasks for forming an open cellular core 401 out of any other suitable material, such as, for instance, metal, metal alloy, ceramic, or any combination thereof. In one or more embodiments, the method may include a task of using the polymer optical waveguides 412 as a template onto which one or more dissimilar materials may be deposited onto or formed around. The dissimilar materials may be deposited onto or formed around the polymer optical waveguides 412 by any suitable process, such as, for instance, electrodeposition, vapor deposition, spray coating, dip coating, or any combination thereof. In another embodiment, the method may include a task of using the polymer optical waveguides 412 to form a mold (e.g., a sand mold), removing the polymer optical waveguides 412, and then casting an open cellular core 401 from the mold. In one embodiment, the method may also include a task of selectively removing the polymer optical waveguides 412 by any suitable process, such as, for instance, by chemically etching the polymer optical waveguides 412. Selectively removing the polymer optical waveguides leaves a plurality of interconnected hollow tubular struts formed out of the material previously deposited onto the polymer optical waveguides 412.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:
1. An energy absorbing structure, comprising:
    a facesheet; and
    an open cellular micro-truss core comprising a unitary lattice structure including a plurality of interconnected struts coupled to the facesheet, wherein the facesheet and the open cellular micro-truss core are wound into a hollow tube structure.

2. The energy absorbing structure of claim 1, wherein the plurality of interconnected struts comprises a plurality of interconnected polymer optical waveguides.

3. The energy absorbing structure of claim 1, wherein the open cellular micro-truss core comprises a material selected from the group of materials consisting of metals, metal alloys, and ceramics.

4. The energy absorbing structure of claim 1, wherein the hollow tube is cylindrical.

5. The energy absorbing structure of claim 1, wherein the hollow tube is non-prismatic.

6. The energy absorbing structure of claim 1, wherein the hollow tube is non-axisymmetric.

7. The energy absorbing structure of claim 1, further comprising a sleeve coupled to an outer surface of the hollow tube structure.

8. The energy absorbing structure of claim 1, further comprising:
a housing enclosing the hollow tube structure; and
a plunger extending through the hollow tube structure and out through an opening in the housing, wherein the plunger is configured to apply a compressive load on the energy absorbing structure when a tensile load is applied to the plunger.

9. The energy absorbing structure of claim 1, wherein a stiffness of the open cellular micro-truss core varies axially, radially, or circumferentially along the energy absorbing structure.

10. The energy absorbing structure of claim 9, wherein the micro-truss core comprises:
a first annular band having a first open volume fraction; and
a second annular band having a second open volume fraction less than the first open volume fraction.

11. An energy absorbing structure, comprising:
a first energy absorbing tubular structure comprising a first open cellular micro-truss core coupled to a first facesheet, the first open cellular micro-truss core comprising a first plurality of interconnected struts defining a first unitary lattice structure; and
a second energy absorbing tubular structure comprising a second open cellular micro-truss core coupled to a second facesheet, the second open cellular micro-truss core comprising a second plurality of interconnected struts defining a second unitary lattice structure, wherein the second energy absorbing tubular structure is concentrically nested in the first energy absorbing tubular structure.

12. The energy absorbing structure of claim 11, wherein a length of the first energy absorbing tubular structure is different than that of the second energy absorbing tubular structure.

13. A method of manufacturing an energy absorbing structure, the method comprising:
irradiating a volume of photo-monomer in a reservoir with collimated light beams to form a partially cured open cellular micro-truss core having a plurality of interconnected polymer optical waveguides defining a unitary lattice structure; and
wrapping the open cellular micro-truss core and a facesheet coupled to the micro-truss core around a mandrel to form the energy absorbing structure.

14. The method of claim 13, further comprising applying an adhesive to a surface of the facesheet opposite the open cellular micro-truss core before the wrapping of the open cellular micro-truss core and the facesheet around the mandrel.

15. The method of claim 13, further comprising fully curing the open cellular micro-truss core prior to the wrapping of the open cellular micro-truss core and the facesheet around the mandrel.

16. The method of claim 13, further comprising fully curing the open cellular micro-truss core after the wrapping of the open cellular micro-truss core and the facesheet around the mandrel.

17. The method of claim 13, wherein the mandrel is prismatic.

18. The method of claim 13, wherein the mandrel is non-prismatic.

19. The method of claim 13, further comprising coupling the open cellular micro-truss core to the facesheet by a process selected from the group of processes consisting of welding, soldering, brazing, bonding, and combinations thereof.

20. The method of claim 13, further comprising coating at least a portion the polymer optical waveguides with a dissimilar material before the wrapping of the open cellular micro-truss core and the facesheet around the mandrel.

21. The method of claim 13, wherein the irradiating of the volume of photo-monomer comprises:
irradiating a first region of the volume of photo-monomer to create a first region of the partially cured open cellular micro-truss core having a first density of polymer optical waveguides; and
irradiating a second region of the volume of photo-monomer to create a second region of the partially cured open cellular micro-truss core having a second density of polymer optical waveguides less than the first density of polymer optical waveguides.

22. The method of claim 13, wherein the irradiating of the volume of photo-monomer comprises:
irradiating a first region of the volume of photo-monomer with collimated light beams at a first angular orientation to create a first region of the micro-truss core defined by interconnected polymer optical waveguides oriented along the first angular orientation; and
irradiating a second region of the volume of photo-monomer with collimated light beams at a second angular orientation to create a second region of the micro-truss core defined by interconnected polymer optical waveguides oriented along the second angular orientation that is different than the first angular orientation.

* * * * *